Aug. 18, 1970  W. R. WINTER  3,524,537

PACKAGE CONTAINING 2-CYANOACRYLIC ESTER ADHESIVES

Filed Sept. 25, 1968  4 Sheets-Sheet 1

INVENTOR.
WILLIAM ROBERT WINTER
BY Lawrence William Flynn

AGENT

Aug. 18, 1970    W. R. WINTER    3,524,537
PACKAGE CONTAINING 2-CYANOACRYLIC ESTER ADHESIVES
Filed Sept. 25, 1968    4 Sheets-Sheet 3

INVENTOR.
WILLIAM ROBERT WINTER
BY Lawrence William Flynn

AGENT

Aug. 18, 1970    W. R. WINTER    3,524,537
PACKAGE CONTAINING 2-CYANOACRYLIC ESTER ADHESIVES
Filed Sept. 25, 1968    4 Sheets-Sheet 4

INVENTOR.
WILLIAM ROBERT WINTER
BY Lawrence William Flynn

AGENT

# United States Patent Office 3,524,537
Patented Aug. 18, 1970

3,524,537
PACKAGE CONTAINING 2-CYANOACRYLIC ESTER ADHESIVES
William Robert Winter, Southbury, Conn., assignor to American Cyanamid Company Stamford, Conn., a corporation of Maine
Filed Sept. 25, 1968, Ser. No. 762,476
Int. Cl. A61b 17/00; B65d 81/00, 85/84
U.S. Cl. 206—47      10 Claims

ABSTRACT OF THE DISCLOSURE

A transparent container fabricated from poly(monochlorotrifluoroethylene) provides for prolonged stable storage and convenient dispensing of 2-cyanoacrylic ester adhesives.

BACKGROUND OF THE INVENTION 2-cyanoacrylic esters, hereinafter sometimes called cyanoacrylates, have enjoyed widespread usage as adhesives. The adhesive properties of cyanoacrylates have been known for years. Certain methods for preparing cyanoacrylates and various useful other information relating thereto are summarized in the Encyclopedia of Polymer Science and Technology, vol. 1, pp. 337–342, Interscience Publishing Company, (1967).

However, it is only recently that the adhesive properties of cyanoacrylates have been found useful in human and animal surgery to provide a vehicle for effectively joining together living tissue. The use of cyanoacrylates in surgical applications is presently a subject of considerable interest to the medical profession and has been the basis for a host of patents and publications relating thereto. For example, see Annals of Surgery, October 1960, p. 648, Archives of Surgery 94, No. 6, pp. 858–864 (1967) U.S. Pat. 3,223,083, and Belgium Pat. 636,286. These references and footnote references contained therein show some of the development of cyanoacrylate adhesives in the surgical field.

The adhesive properties of cyanoacrylates result from the polymerization of cyanoacrylate monomer in the presence of a substance which instigates anionic polymerization, such as, for example, water contained in body tissue fluid. The monomer is applied to living tissue adherends whereupon water in the tissue fluid thereby causes it to polymerize and form a strong and tenacious bond between the tissue adherends. Even small traces of water or other anionic polymerization initiators can instigate the rapid polymerization of the cyanoacrylate monomer and it is customary to add small amounts of anionic polymerization inhibitors to the monomer to afford some control over such "spontaneous" polymerization.

The property of cyanoacrylates which makes them useful as a surgical adhesive (i.e. polymerization in the presence of moisture) raises a serious problem in regard to packaging these monomers for stable storage for long periods of time. A suitable container for cyanoacrylate monomer must have a high degree of gas and water vapor impermeability. This is to prevent water vapor in the air from permeating the container and thereby causing the monomer contained therein to polymerize before it can be used. It is also important that the container be impermeable to vapors other than water which could similarly polymerize monomer should they gain entry into the container. An example of this latter problem occurs when one wants to sterilize the outer surface of a monomer container by conventional ethylene oxide techniques. Ethylene oxide is a preferred method of sterilizing such containers since it avoids the high temperatures encountered in autoclaving which can cause polymerization of the monomer in the container. During the ethylene oxide sterilization cycle, the container is ordinarily subjected to a mixture of pressurized ethylene oxide, carbon dioxide, and water for extended periods of time. Should appreciable amounts of water penetrate the container the product contained therein could be ruined by excessive polymerization as discussed heretofore. However, there is also reason to believe that should ethylene oxide permeate the container a similar undesirable effect would be noted.

It is equally important that a container have a high degree of impermeability towards cyanoacrylate monomer vapor and liquid. Should vapor or liquid escape from the container it will polymerize upon contact with the ordinarily moist environment surrounding the container to produce an undesirable white film on the external surface of the container. The presence of such a film would make the container totally unacceptable to the medical profession. It therefore becomes apparent that if one desires to store cyanoacrylate monomer for any appreciable amount of time, the container must not only prevent vapors which can cause polymerization of the monomer from entering the container but the container must also prevent monomer vapor and liquid from escaping and polymerizing on the external surfaces of the container. It is also highly important that the container material selected be hermetically sealable so as to prevent leaks either into or out of the package at the seal points.

Transparency is a further desirable property of a cyanoacrylate monomer container. This is particularly so when the adhesives contained therein is to be used in a surgical application since it is important for the surgeon to know the degree of polymerization which has occurred in the container contents prior to using them in an operation. If excessive polymerization has occurred there may be insufficient monomer present to effect the desired surgical adhesion. With a transparent container, the extent of polymerization can be readily gauged by noting the viscosity of the contents of the container. Furthermore, when a container is transparent a surgeon, in the course of an operation, can tell at a glance how much material remains and can thereby better plan his subsequent surgical procedures.

Another distinctive advantage of a transparent container is the prevention of accidental discharge of monomer either onto the surgeon's hand or into an improper location in the operative patient. Such discharges can occur when the surgeon cannot follow visually the movement of the monomer to and through the discharge orifice of the container. Since the monomer sets up rapidly and is quite difficult to remove from a substrate with which it comes into contact, an accidental discharge of this sort could create serious problems during surgery, particularly if the surgeon's fingers should become stuck together or to another object.

In view of the above requirements, it is apparent that a container material of most unusual properties is required to adequately handle cyanoacrylate monomer which is intended for surgical use. Attempts have been made to provide such a container; for example, see U.S. Pat. 3,360,124 in which a hermetically sealed tin container is proposed. Unfortunately, tin is not transparent. It is also quite costly and is known to be extremely difficult to hermetically seal. It is also known that certain anionic polymerization inhibitors such as hydrogen fluoride react with the tin to thereby deposit an additional foreign substance in the cyanoacrylate. Obviously, a package which is chemically inert toward its contents is highly preferred.

It has now been found that all of the desirable properties listed hereinabove for a cyanoacrylate adhesive packaging material are possessed to an unusual degree by the container of this invention.

SUMMARY OF THE INVENTION

This invention relates to a transparent package containing 2-cyanoacrylic esters. More particularly, this invention relates to a container for said esters which is fabricated from poly(monochlorotrifluoroethylene). Cyanoacrylates have been found to be in good condition and eminently suitable for surgical usage after storage in the container of this invention for periods of at least six months at temperature of 30° C. or less and at least one year at refrigeration temperatures (i.e. about 4° C.). At the end of such storage periods the viscosity of the contents is substantially the same as when the package was initially prepared. Moreover, there is no escape of cyanoacrylate monomer from the container as indicated by a total lack of white polymer on the external surface of the package. The container is highly transparent permitting one to readily view the contents thereof. The container can be prepared as a rigid or a collapsible article depending on the thickness of the poly(monochlorotrifluoroethylene) selected.

Many other packaging materials were evaluated and found lacking on one or more respects.

For example, glass is not collapsible and, furthermore, initiates polymerization of the cyanoacrylate monomer upon prolonged contact therewith.

Low and high density polyethylene permitted a noticeable and rapid diffusion of monomer vapor out of the container as evidenced by the appearance of a substantial amount of a white polymer film on the surface of the container within a very brief time (several hours).

Saran® (a vinyl chloride-vinylidene chloride copolymer) which is generally known to have good vapor barrier properties permitted cyanoacrylate monomer to escape and polymerize on the external surface of the package after three weeks storage at 37° C.; in addition, the Saran® film was badly and permanently distorted.

Cellulose acetate and a laminate of cellulose acetate, Saran®, and polyethylene, similarly permitted cyanoacrylate monomer to escape as evidenced by the appearance of a white polymeric film on the surface of the container within 16 hours at 37° C.

Mylar®, (a polymeric ester of ethylene glycol and terephthalic acid) although having good vapor carrier properties, was extremely difficult to hermetically seal without polymerizing the contents and could not be used for that reason.

Mylar®-polyethylene laminate caused the contents of the container to polymerize within a short time (about two months) after preparation of the package thereby indicating entry of a polymerization initiator into the contents of the container.

Other haloethylene polymers such as poly(tetrafluoroethylene) (Teflon®) gave storage stable containers; however, they were not transparent and are known to be quite difficult to fabricate into sheets or tubing suitable for containers.

It is therefore an object of this invention to provide a novel and collapsible transparent container for cyanoacrylate monomers having the capability of preventing entry into the container of polymerization initiators while simultaneously preventing exit from the container of cyanoacrylate monomer vapor and liquid.

DESCRIPTION OF THE PREFERRED EMBODIMENTS

Figure 1:
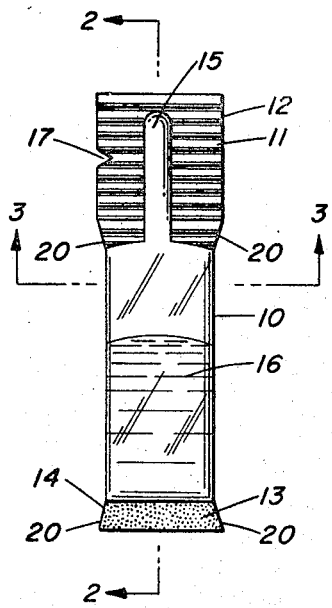
FIG. 1 is a face view of a preferred container of this invention containing therein a cyanoacrylate adhesive.

Methods for preparing poly(monochlorotrifluoroethylene) are well known. A summary of such methods and other useful information relating to this polymer are provided in the Encyclopedia of Polymer Science and Technology, vol. 7, pp. 204–219, Interscience Publishing Company (1967). Poly(monochlorotrifluoroethylene) is available commercially from the Minnesota Mining and Manufacturing Company under the trademark Kel-F® and from Allied Chemical Company under the trademark Aclar®. The poly(monochlorotrifluoroethylene) offered by Allied under the trademark Aclar® 22 has been used in most of the experimental work relating to this invention and found quite satisfactory.

The poly(monochlorotrifluoroethylene) can originate from a variety of physical forms such as sheeting or tubing. When a collapsible package is desired, tubing having a wall thickness of about 4 to 8 mils is a preferred starting material.

The package of the invention may be utilized with a variety of cyanoacrylates such as alkyl-2-cyanoacrylates and fluoroalkyl-2-cyanoacrylates. The term "alkyl" means straight and branched chain hydrocarbons containing from 1 to 12 carbon atoms. Illustrative alkyl-2-cyanoacrylates are:

| | |
|---|---|
| methyl-2-cyanoacrylate | hexyl-2-cyanoacrylate |
| ethyl-2-cyanoacrylate | heptyl-2-cyanoacrylate |
| propyl-2-cyanoacrylate | octyl-2-cyanoacrylate |
| isopropyl-2-cyanoacrylate | nonyl-2-cyanoacrylate |
| butyl-2-cyanoacrylate | decyl-2-cyanoacrylate |
| isobutyl-2-cyanoacrylate | undecyl-2-cyanoacrylate |
| pentyl-2-cyanoacrylate | dodecyl-2-cyanoacrylate |

An illustrative fluoroalkyl-2-cycanoacrylate is trifluoroisopropyl-2-cyanoacrylate.

A preferred cyanoacrylate is n-pentyl-2-cyanoacrylate since this particular species appears to have exceptionally good wound healing characteristics coupled with low toxicity toward living tissue.

The contents of the container may exist in a variety of forms. For example, substantially pure monomer can be used; alternatively, monomer which has been thickened by addition of various thickening agents such as, for example, polymethylmethacrylate or polycyanoacrylate may also be used. The thickened material facilitates use of the adhesive by the surgeon since its viscosity insures that it will remain where it was placed by the surgeon and will not spill or "run" into other areas of the operative area. A preferred form of cyanoacrylate adhesive is a thickened composition containing up to about 30% of polymeric cyanoacrylate and the remainder monomeric cyanoacrylate. Such a composition is conveniently prepared in situ by exposing cyanoacrylate monomer to any free radical polymerization initiator, preferably ultraviolet light, until polymerization has proceeded to a point where the viscosity of the composition is from about 50 to about $50 \times 10^5$ centipoises at 25° C.

Since cyanoacrylates are susceptible to both anionic and free radical polymerization it is advisable to add to the cyanoacrylate composition an anionic polymerization inhibitor such as hydrogen fluoride, or sulfur dioxide, and a free radical polymerization inhibitor such as butylated hydroxy toluene, propyl gallate, or hydroquinone in small amounts to prevent "spontaneous" polymerization.

Figure 2:
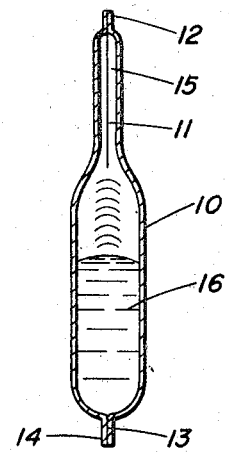
FIG. 2 is a sectional view along the line 2—2 of FIG. 1.
Figure 3:
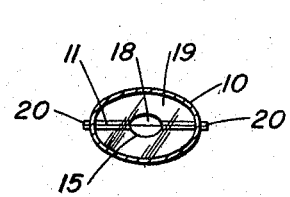
FIG. 3 is a sectional view along the line 3—3 of FIG. 1.

FIGS. 1 to 3 show preferred embodiment of the container of this invention in several different views. The container comprises an elliptical cross sectioned collapsible tubular portion 10 having a first hermetic seal 11 at discharge end 12 of the container and a second hermetic seal 13 at bottom end 14 of the container. Seal 11 is shaped to provide discharge orifice 15 which permits controlled discharge of cyanoacrylate adhesive 16 when tear notch 17 in seal 11 is opened (see FIG. 8). It will be noted that the cross section 18 of orifice 15 is substantially smaller than the cross section 19 of tube 10. This permits controllable and directed discharge of contents 16 when tube 10 is collapsed under thumb pressure. This also prevents surges of large amounts of material should thumb pressure or any other form of collapsing pressure be inadvertently applied to an opened container. When seals 11 and 13 are formed, a slight broadening 20 of the width of tube 10 occurs at each seal.

Figure 4:
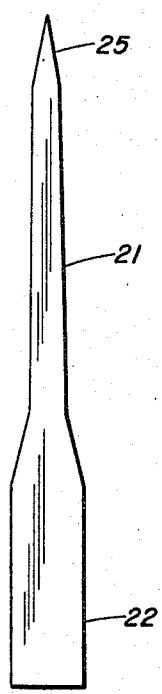
FIG. 4 is a face view of an applicator tool which is particularly useful for positioning the cyanoacrylate adhesive on tissue after discharge from its container.
Figure 5:
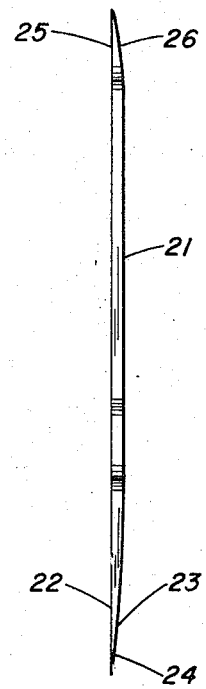
FIG. 5 is a side view of the applicator of FIG. 4.

FIG. 4 illustrates an applicator 21 which is particularly suitable for spreading or otherwise positioning adhesive 16 once it is dispensed into the surgical field. Applicator 21 should be prepared from materials which will not stick inseparably to the adhesive; polyethylene, polypropylene, poly(tetrafluoroethylene) and materials coated with the aforementioned polymers are quite suitable; an applicator made entirely of polypropylene is preferred. Referring to FIG. 5 it will be noticed that the broad end 22 of applicator 21 is tapered 23 to provide a thin and flexible tip area 24 to facilitate spreading and positioning of the adhesive. The narrow tip 25 of applicator 21 is also tapered 26 for a similar reason.

Figure 6:
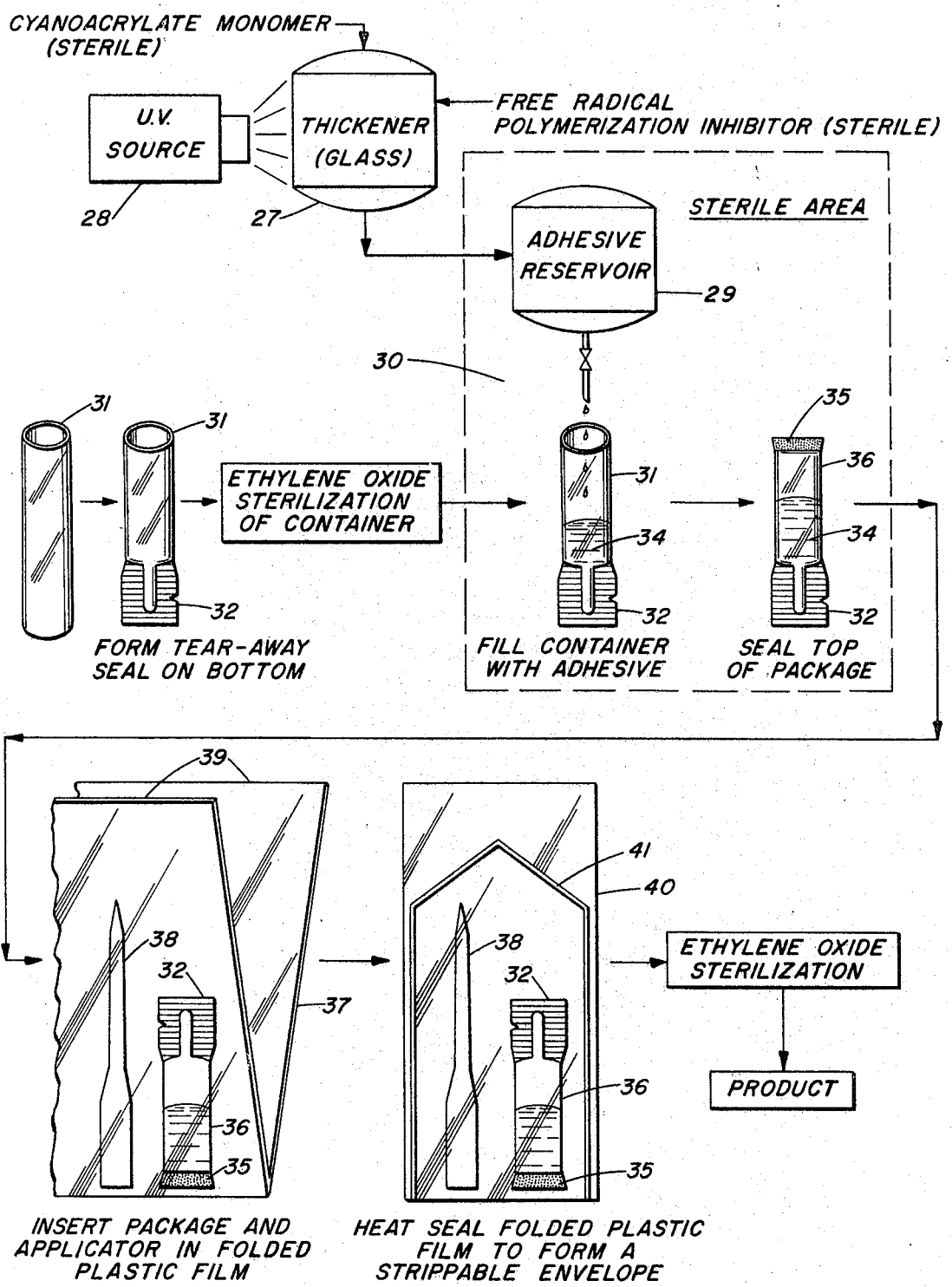
FIG. 6 is a schematic flow sheet indicating a process for preparing, filling, and sterilizing the poly(monochlorotrifluoroethylene) container of this invention.

Referring to FIG. 6, cyanoacrylate monomer (containing an anionic polymerization inhibitor) which has been prepared by an aseptic synthesis is fed to thickener 27 where it is exposed to ultraviolet light source 28 for a period of time sufficient to partially polymerize the polymer to the desired extent as discussed heretofore. At this point sterile free radical polymerization inhibitor is added to the thickened cyanoacrylate contained in thickener 27. The thickened cyanoacrylate is transferred to adhesive reservoir 29 located in sterile area 30 to insure continuing sterility of the mixture. A portion of poly(monochlorotrifluoroethylene) tubing 31 of appropriate length is hermetically sealed at one end to produce tear away seal 32. The inner and outer surfaces of tube 31 containing seal 32 are then sterilized by ethylene oxide. Sterile tube 31 is transferred to sterile area 30 where it is filled to the appropriate level with sterile adhesive 34 from reservoir 29. Tube 31 containing adhesive 34 is then hermetically sealed in sterile area 30 to produce seal 35. Sealed container 36 at this point contains sterile adhesive 34. Hermetic sealing as discussed above can be carried out either ultrasonically or dielectrically, the details of such techniques being well known to those skilled in the art. Hermetic sealing is required to produce packages which guarantee the stability of the cyanoacrylate contents. Heat sealed containers, for example, will not consistently guarantee stability due to leaks either into or out of the container at the seal points. Container 36 is then removed from sterile area 30 and inserted into folded film 37 which ultimately forms an outer strippable envelope for container 36. Film 37 can be fabricated from a variety of packaging materials. It is desirable that film 37 be transparent and permeable to ethylene oxide vapor to facilitate sterilization of the inner space of the strippable outer envelope. A preferred material for use as film 37 is a Mylar® polyethylene laminate such as that described in greater detail in U.S. Pat. 2,949,181. Other suitable materials are paper-plastic film laminates and metallic foil-plastic film laminates.

At this point, it becomes convenient to also add to film 37 disposable applicator 38 so as to provide an individual unit of one cyanoacrylate adhesive container 36 and one applicator 38 designated for single usage followed by disposal of the entire unit. Folds 39 of film 37 are sealed together using a cathedral shaped sealing die to form outer package 40 having strippable cathedral seal 41, wherein applicator 38 and container 36 are contained. Package 40 is placed in ethylene oxide sterilization oven whereby ethylene oxide permeates into the inner space of package 40 to sterilize applicator 38, the external surface of adhesive container 36 and the surfaces of film 37 which define the inner space of package 40.

Of course, a wide variety of collapsible containers having therein a sterile cyanoacrylate may similarly be packaged in an outer strippable envelope. An example of such a container is the tin container described in U.S. Pat. 3,360,124. When the internal and external surfaces of the container as well as the inner space defined by the external surface of the container and the internal surfaces of the outer strippable envelope are rendered sterile, such a package provides a novel method of serving a sterile cyanoacrylate adhesive contained in a collapsible container to a surgeon. Such sterile serving is a particular advantage in the case of cyanoacrylates due to the difficulties encountered in attempting to sterilize packaged cyanoacrylates by such conventional hospital techniques as autoclaving. If a collapsible container of cyanoacrylate not packaged in an outer envelope is to be served to a surgeon in a sterile area of the operating room, it would be necessary to sterilize at least the outer surface of the container to eliminate possible contamination of the adhesive upon discharge from the container.

Figure 7:
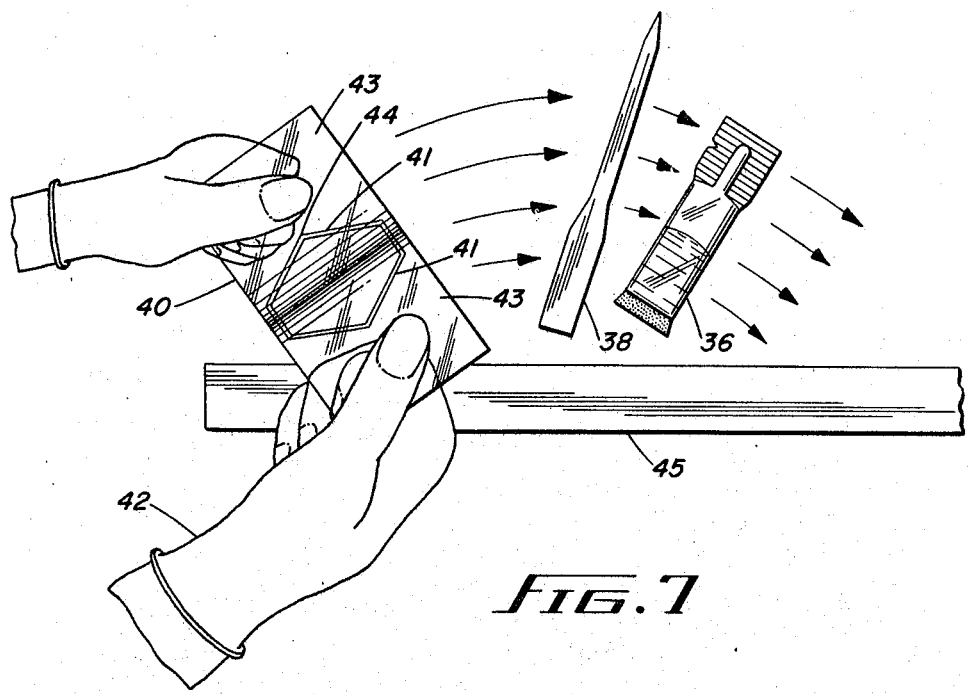
FIG. 7 shows a method of opening the strippable outer envelope containing the packaged adhesive and applicator to sterilely transfer the adhesive and applicator to a desired location.
Figure 8:
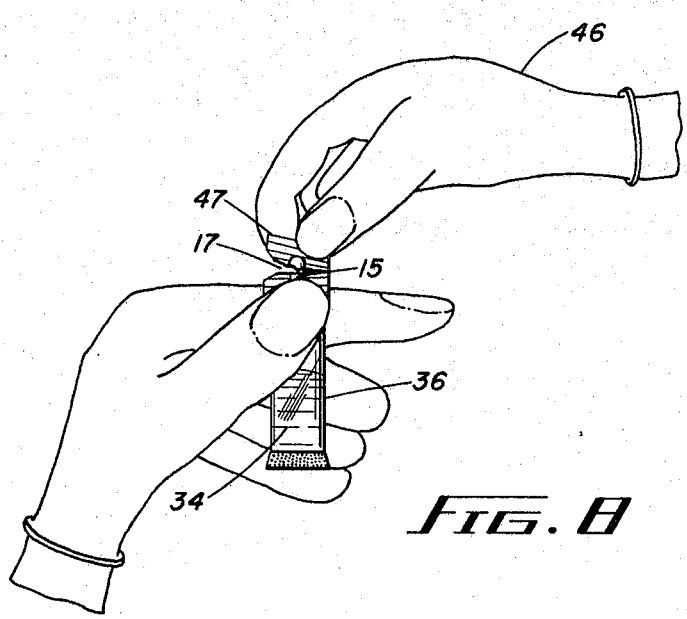
FIG. 8 shows a method for conveniently opening the adhesive container of this invention.
Figure 9:
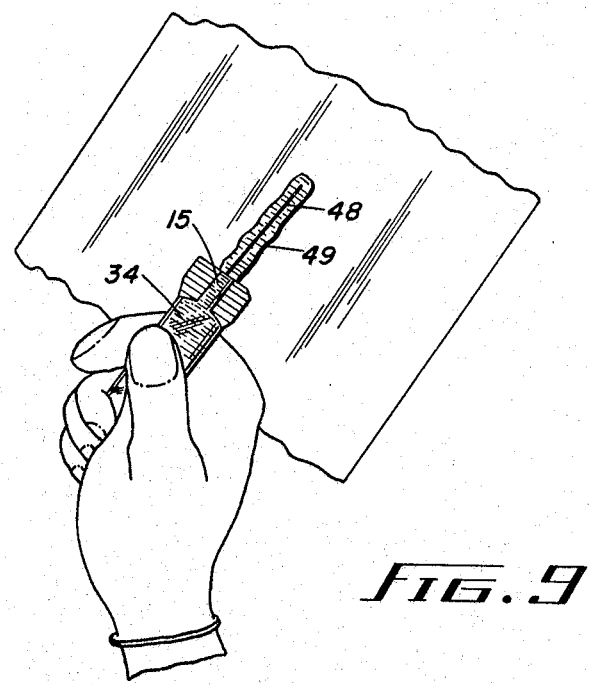
FIG. 9 shows a typical application of the adhesive from the container to a surgical wound.

FIGS. 7 to 10 illustrate how package 40 can be used in an actual surgical application. Package 40 is completely sterile except for its outer surfaces. In the operating room, circulating nurse 42 grasps flaps 43 of package 40 pulling these flaps apart and downward to begin separation of seal 41 at seal tip 44. As separation of seal 41 continues, applicator 38 and cyanoacrylate container 36 are discharged from package 40 and projected as shown in FIG. 7 onto stand 45 which is contained in the sterile area of the operating room. (Alternatively, the scrub nurse may remove them from the stripped package). The scrub nurse 46 then removes container 36 from stand 45 and, as shown in FIG. 8, removes the top 47 of package 36 by tearing off top 47 at tear notch 17. When top 47 is completely removed, discharge orifice 15 is open to the atmosphere and adhesive 34 is readily discharged through orifice 15 by applying pressure to container 36.

Figure 10:
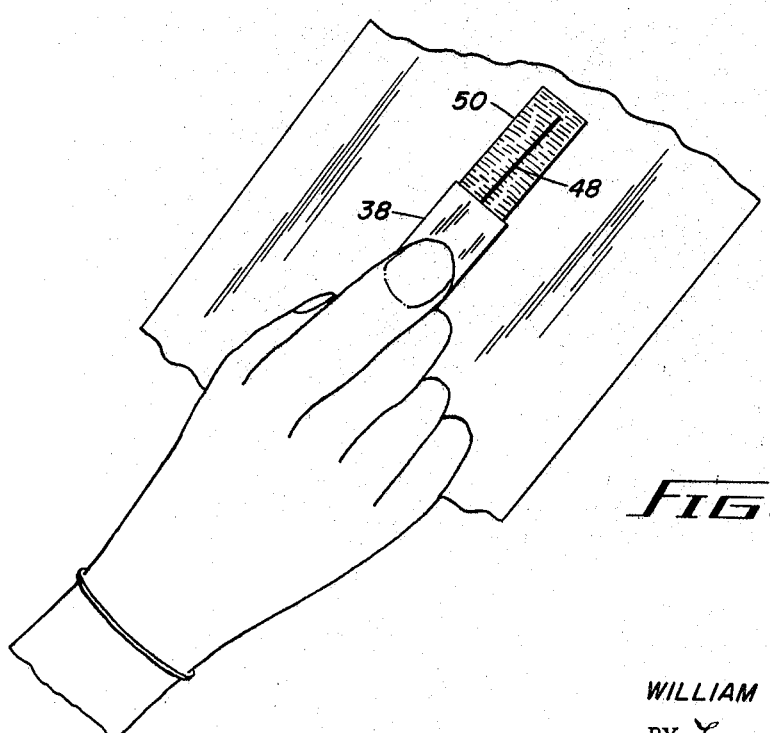
FIG. 10 shows the use of the applicator after the adhesive has been applied to a surgical wound.

Prior to applying adhesive 34 to wound 48 (see FIG. 9) the wound is clamped or otherwise joined together and sponged to remove tissue fluid. Sponging is desirable in order to remove as much of the water from the wound site as possible and thereby reduce the rate of polymerization of the monomer in order to provide additional time for the surgeon to manipulate dispensed adhesive 49 which now covers wound 48. When the adhesive has been dispensed the surgeon is handed applicator 38 whereupon as shown in FIG. 10 he can spread the adhesive into a finer layer 50 or otherwise position the adhesive as desired.

While any quantity of cyanoacrylate may be contained in a container of this invention, a quantity of one cubic centimeter has been found adequate for most surgical applications. Since cyanoacrylates tend to rapidly polymerize in the presence of a moist environment it is difficult to reseal them for further use at a latter date. For this reason small quantities are quite economical since what is not used can be discarded at minimum expense. On the other hand should additional adhesive be required it becomes quite simple to merely open another container.

Poly(monochlorotrifluoroethylene) containers are most suitable for storing cyanocrylates under ordinary storage conditions such as exist in warehouses and hospital storage areas where the package would be expected to receive little, if any, exposure to ultra-violet (UV) light. However, when storage is anticipated which will subject the package to substantial amounts of UV light, such as, for example, storage during which the package is exposed to sunlight, it is advisable to provide means for preventing the UV light from penetrating into the cyanoacrylate and thereby initiating undesirable free radical polymerization of the monomer prior to usage of the adhesive. One method of preventing UV light from penetrating into the cyanoacrylate is to insert a material which absorbs UV light between the light source and the cyanoacrylate. When the package of this invention is to be further enclosed in an outer strippable envelope such as is shown in FIG. 6, this is most conveniently done by adding an UV absorbing compound to the outer envelope material during its fabrication or, alternatively, by coating the outer envelope material with an UV absorbing material after its is fabricated. If an UV absorbing material is added during fabrication, it should be stable at temperatures up to the usual extrusion temperature of the strippable envelope material. Addition of the UV absorbing material to the outer envelope is preferable to adding it to the inner envelope since no risk of contaminating the cyanoacrylate monomer with the UV absorbing material is encountered.

Among suitable UV absorbing materials may be mentioned the benzophenones such as 2-hydroxy-4-octyl-oxy-benzophenone; the benzotriazoles such as 2-(2-hydroxy-5-octylphenyl)benzotriazole; the benzilidines such as the dimethyl ester of para-methoxy benzoilidine malonic acid; and the salicylates such as para-tertiary octylphenyl salicylate.

When such UV absorbing materials are added during fabrication of the outer envelope material they are typically added in amounts of about 1 to 3% by weight based on the weight of envelope material. In cases where the outer envelope is a plastic material, it is convenient to dry blend powdered plastic and UV absorbing material prior to extrusion.

If the outer envelope is to be coated with an UV absorbing material, a suitable coating solution can be prepared by dissolving 15 parts of polyvinyl chloride and .4 to .7 part of an UV absorbing material in about 84.5 parts of a solvent such as tetrahydrofuran or cyclohexanone. The outer envelope material is then dipped in the solution to thereby deposit a 1–2 mil thick coating of UV absorbing material and polyvinyl chloride on the surface.

The poly(monochlorotrifluoroethylene) container of this invention can, of course, also be treated with UV absorbing materials using the techniques discussed heretofore in regard to the outer strippable envelope.

I claim:
1. A hermetically sealed package comprising a poly(monochlorotrifluoroethylene) container having therein a sterile 2-cyanoacrylic ester selected from the group consisting of alkyl-2-cyanoacrylates and fluoroalkyl-2-cyanoacrylates.
2. The package of claim 1, wherein said container is in a sterile condition.
3. The package of claim 1, wherein said container is collapsible by thumb pressure and wherein said container contains a discharge orifice, the cross section of said orifice being substantially smaller than the cross section of the bulk of the container.
4. The package of claim 3, wherein the cyanoacrylate contents thereof comprise up to about 30% polymeric cyanoacrylate and the remainder monomeric cyanoacrylate and wherein said cyanoacrylate contents contain a free radical polymerization inhibitor and an anionic polymerization inhibitor in sufficient amount to prevent spontaneous polymerization of the contents.
5. The package of claim 4, wherein the cyanoacrylate is n-pentyl-2-cyanoacrylate and where said container is in sterile condition.
6. The package of claim 5, wherein said container is enclosed in a sterile enclosure.
7. The package of claim 6, wherein said sterile enclosure further contains a sterile applicator tool for said cyanoacrylate.
8. The package of claim 6, wherein the material from which said sterile enclosure is fabricated contains an effective amount of an ultra-violet light absorbing material whereby said enclosure is rendered substantially impervious to ultra-violet light.
9. The package of claim 2, wherein said poly(monochlorotrifluoroethylene) contains an effective amount of an ultra-violet light absorbing material whereby said container is rendered substantially impervious to ultra-violet light.
10. A package comprising:
(a) A container having therein a sterile 2-cyanoacrylic ester selected from the group consisting of alkyl-2-cyanoacrylates and fluoroalkyl-2-cyanoacrylates, the inner and outer surfaces of said container being sterile and
(b) A sterile sealed enclosure having therein said container, said enclosure having a strippable seal.

References Cited
UNITED STATES PATENTS

| | | | |
|---|---|---|---|
| 1,880,813 | 10/1932 | Coe | 229—3.5 |
| 3,083,821 | 4/1963 | Woodson. | |
| 3,189,174 | 6/1965 | Cormack | 206—63.2 |
| 3,223,083 | 12/1965 | Cobey | 128—334 |
| 3,315,802 | 4/1967 | Lonholdt et al. | 206—63.2 |
| 3,336,669 | 8/1967 | Kramer. | |
| 3,360,124 | 12/1967 | Stonehill | 206—84 |

WILLIAM T. DIXSON, Jr., Primary Examiner

U.S. Cl. X.R.

128—334; 206—63.2, 84

UNITED STATES PATENT OFFICE
CERTIFICATE OF CORRECTION

Patent No. 3,524,537    Dated August 18, 1970

Inventor(s) WILLIAM ROBERT WINTER

It is certified that error appears in the above-identified patent and that said Letters Patent are hereby corrected as shown below:

Column 3, line 43 "carrier" should read -- barrier --.

Column 6, line 4 "in ethylene oxide" should read -- in $\underline{a}$ ethylene oxide --.

Column 6, line 25 "surgean" should read -- surgeon --.

Column 6, line 63 "latter" should read -- later --.

SIGNED AND
SEALED

Febuary 2, 1971

(SEAL)
Attest:

Edward M. Fletcher, Jr.

Attesting Officer

WILLIAM E. SCHUYLER, JR.
Commissioner of Patents